R. E. FOOTE.
TAPERED SLEEVE.
APPLICATION FILED AUG. 19, 1916.

1,252,335. Patented Jan. 1, 1918.

Inventor
Robert Ellmore Foote
By Brown, Hanson & Boettcher
Attorneys.

UNITED STATES PATENT OFFICE.

ROBERT ELLMORE FOOTE, OF HARVEY, ILLINOIS, ASSIGNOR TO SCULLY JONES & COMPANY, OF CHICAGO, ILLINOIS, A CORPORATION OF ILLINOIS.

TAPERED SLEEVE.

1,252,335.            Specification of Letters Patent.       Patented Jan. 1, 1918.

Application filed August 19, 1916. Serial No. 115,770.

*To all whom it may concern:*

Be it known that I, ROBERT ELLMORE FOOTE, a citizen of the United States, residing at Harvey, in the county of Cook and State of Illinois, have invented a certain new and useful Improvement in Tapered Sleeves, of which the following is a full, clear, concise, and exact description, reference being had to the accompanying drawings, forming a part of this specification.

My invention relates to tapered sleeves of the general type whereby a particular tool is secured to the spindle of a power machine such as a lathe, drill-press or the like.

My invention aims particularly to provide a tapered sleeve for holding straight-shanked taps and the like.

The particular sleeve which I shall describe and which forms one embodiment of my invention is simple in construction, inexpensive to manufacture and grips the stem or shank of the drill or other tool in a very reliable manner.

Heretofore when it has been desired to employ a tap in the spindle of a drill-press or lathe it has been considered necessary to employ a gripping chuck. My invention obviates the necessity of the complicate and none too reliable chuck.

In the accompanying drawings in which I have illustrated one embodiment of my invention, Figure 1 is an elevation of the tapered sleeve of my invention;

Figure 1:
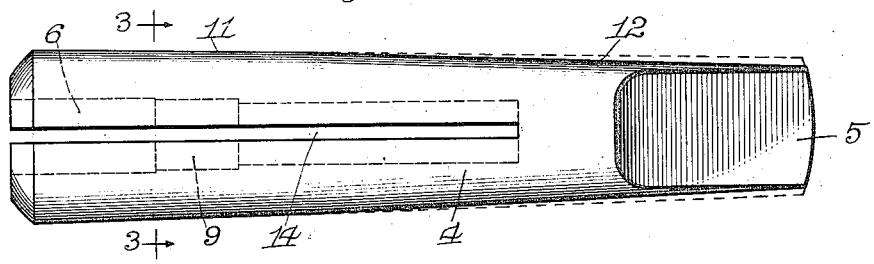
Figure 2:
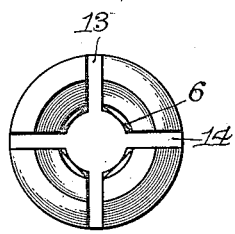
Fig. 2 is a front elevation of the same.
Figure 3:
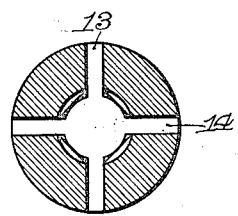
Fig. 3 is a section taken on the line 3, 3, of Fig. 1.
Figure 4:
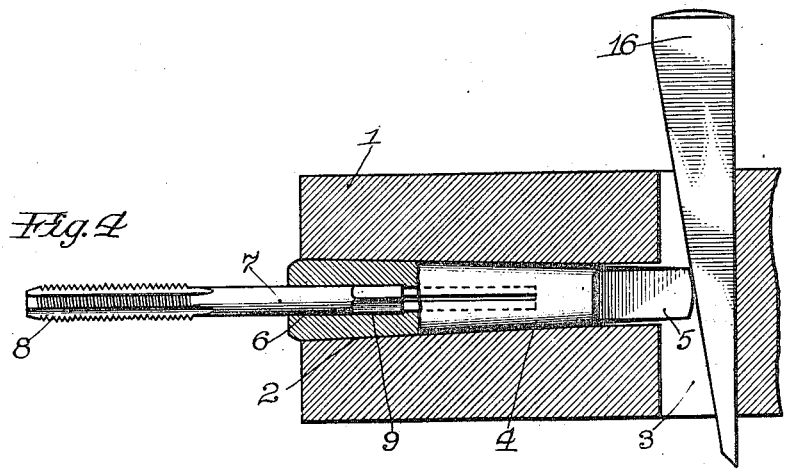
Fig. 4 is a fragmentary sectional elevation, showing the sleeve in the socket of the machine spindle and the tap held within the tapered sleeve.

The spindle 1 of the machine, which may be either a drill-press, lathe or the like, is provided with a tapered socket. The socket 2 is formed on a standard taper, as is well known in the art. A transverse slot 3 passing through the spindle 1 forms means for positively engaging the end of the sleeve 4 which is flattened at its smaller end, as shown at 5 in Figs. 1 and 4. The flattened portion 5 fits in the slot 3 and positively prevents turning of the sleeve 4. The sleeve is provided with a central bore which consists of an outer circular counter-bore 6 of sufficient size to receive the round shank 7 of the tap 8. Back of the round counter-bore 6 the hollow bore of the sleeve is squared, as shown at 9, in order to receive the squared end of the tap 8, as is shown in Fig. 4. The bore of the sleeve extends well toward the rear, as is shown in dotted lines in Figs. 1 and 4. The tapered sleeve 4 is slotted by two right angle cuts or kerfs which form in effect quartered spring fingers. The slots 13 and 14 may be made with a milling cutter and are relatively narrow to preserve as large a bearing surface along the tapered exterior as is possible without running the liability of having the slots 13 and 14 fill up with dirt, chips, or the like. The taper of the sleeve 4 is made in two distinct steps. The taper along the outer end of the sleeve, along the surface indicated at 11 in Fig. 1 is the standard Morse taper well known in the art. The rear end of the sleeve is ground away at a slightly different taper, as indicated in exaggerated form by the character 12 in Fig. 1. The portion that is ground away at 12 is from 1/10,000 to 1/20,000 of an inch per inch, although the particular degree of taper is not of the essence of the invention. The desideratum is to permit the tapered sleeve 4 to be driven farther into the socket 2 in order to bring the spring fingers concentrically toward each other to grip the shank of the drill or tap. If the portion 12 were not ground away this part of the tapered sleeve would bind in the socket, thereby making it impossible for the sleeve to be driven farther into the socket.

A wedge 16 of suitable form to enter the slot 3 is provided for driving the tapered sleeve 4 out of the socket 2.

I am aware that it has been common in the prior art to provide a tapered sleeve for entering the socket of the machine spindle for holding different sizes of drills, taps and the like, but the sleeves of the prior art have been provided with keys or set-screws which in each instance have been found to be unreliable both due to the insecure hold that they have upon the tool and due to the lack of correct centering. The sleeve constructed in accordance with my invention, as above described, grips the shank of the tap 8 firmly and holds the same exactly in the center of the socket by the uniform wedging action of the slit tapered sleeve. In practice I provide the machine with a number of sleeves of this character in order to hold taps and drills of different sizes. However, I employ the same sleeve to grip taps and the like varying as much as 1/16 of an inch in diameter. That is to say, each driving sleeve is adapted to receive drills or taps within a range of say, 1/16 of an inch. For example from 3/8 to 7/16 of an inch, and the next larger size is employed for drills or taps of from 7/16 to 1/2 inch.

In manufacturing the tapered sleeve of my invention I prefer to construct the same of soft steel, machining the various surfaces and then case-hardening the sleeve as is well known in the art.

The operation of the sleeve is apparent from the above description. The tap 8 is placed in the sleeve of the proper size and the sleeve is then driven into the socket 2 to a point where the spring fingers 15 grip the shank 7 of the tap or drill, as the case may be. When the tap or drill is to be removed the wedge 16 is inserted in the slot 3 to force the sleeve out of the socket 2.

I wish it to be understood that I do not intend to be limited to the precise details above described and illustrated, nor do I intend to limit the invention to the forms, sizes or proportions shown and indicated.

I claim:

1. A tapered sleeve adapted to engage and fit into a taper socket, said sleeve having a central bore, the front end of said sleeve being adapted to fit into said socket and the rear or smaller end of said sleeve being ground to a greater angle of taper than the front end.

2. A tapered sleeve adapted to fit into and be frictionally held in a tapered socket, said sleeve having a central bore for receiving a tap, drill or the like, the front or larger end of said tapered sleeve being slotted and having a taper adapted to fit and bind in the tapered socket with which it is to be used, the rear or smaller end of said sleeve being ground away at a greater degree of taper than the front or larger end to permit axial movement of the sleeve in the tapered socket whereby the front or larger end of said sleeve is caused to contract uniformly and concentrically.

3. A holding sleeve adapted for insertion into a tapered socket, said sleeve having a main taper conforming to that of the socket and a supplemental taper in continuation of first said taper but of greater degree than the same.

4. A tapered sleeve having a bore opening at the larger end thereof, and provided with a plurality of slots forming jaws at said larger ends, said sleeve being adapted for insertion into a tapered opening, the angle or degree of taper of said sleeve being greater nearing the smaller end thereof than at the opposite end whereby the smaller intact end of the sleeve will not interfere with the contraction of the larger end to engage an object inserted into said bore.

5. A holding sleeve having a round socket therein extending for a considerable distance, the intermediate portion of the socket being square to receive the squared portion of a drill or tap shank.

In witness whereof, I hereunto subscribe my name this 16th day of August A. D. 1916.

ROBERT ELLMORE FOOTE.